(12) United States Patent
Seo et al.

(10) Patent No.: US 12,379,530 B2
(45) Date of Patent: Aug. 5, 2025

(54) PRISM FOR OPTICAL IMAGING SYSTEM HAVING PROTRUSION ON SIDE SURFACES

(71) Applicant: SAMSUNG ELECTRO-MECHANICS CO., LTD., Suwon-si (KR)

(72) Inventors: Sot Eum Seo, Suwon-si (KR); Ho Sik Yoo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 736 days.

(21) Appl. No.: 17/004,197

(22) Filed: Aug. 27, 2020

(65) Prior Publication Data

US 2021/0063616 A1 Mar. 4, 2021

(30) Foreign Application Priority Data

Aug. 30, 2019 (KR) .................. 10-2019-0107438

(51) Int. Cl.
*G02B 1/11* (2015.01)
*G02B 5/04* (2006.01)
(Continued)

(52) U.S. Cl.
CPC .............. *G02B 5/04* (2013.01); *G02B 1/11* (2013.01); *G02B 5/208* (2013.01);
(Continued)

(58) Field of Classification Search
CPC .. G02B 5/04; G02B 2006/12114; G02B 6/34; G02B 6/3528; G02B 6/4214; G02B 7/1805; G02B 13/0065; G02B 13/007; G02B 13/10; G02B 17/04; G02B 17/045; G02B 23/02; G02B 23/04; G02B 26/0883; G02B 26/0891; G02B 27/0972; G02B 27/642

See application file for complete search history.

(56) References Cited

U.S. PATENT DOCUMENTS 5,453,859 A 9/1995 Sannohe et al.
8,665,175 B2 * 3/2014 Brooks .................. H01Q 1/002
359/359

(Continued)

FOREIGN PATENT DOCUMENTS

CN 101097293 A 1/2008
CN 101248981 A 8/2008
(Continued)

OTHER PUBLICATIONS

English translation of Murata et al., JP 2007-328191 A (Year: 2007).*

(Continued)

*Primary Examiner* — Ryan S Dunning
(74) *Attorney, Agent, or Firm* — NSIP Law

(57) ABSTRACT

A prism for an optical imaging includes an incident surface on which light is incident; an emission surface from which light is emitted; a reflective surface configured to reflect light incident to the incident surface to the emission surface; and a discontinuous portion disposed at one or both of a boundary portion between the incident surface and the reflective surface and a boundary portion between the emission surface and the reflective surface.

12 Claims, 7 Drawing Sheets

(51) Int. Cl.
    *G02B 5/20*      (2006.01)
    *G02B 7/18*      (2021.01)
    *G02B 13/00*      (2006.01)
    *G02B 27/00*      (2006.01)
    *H04N 23/50*      (2023.01)

(52) U.S. Cl.
    CPC ........ *G02B 27/0018* (2013.01); *G02B 7/1805* (2013.01); *G02B 13/0065* (2013.01); *H04N 23/50* (2023.01)

(56) References Cited

U.S. PATENT DOCUMENTS

| | | |
|---|---|---|
| 2002/0030900 A1 | 3/2002 | Tominaga |
| 2009/0262442 A1* | 10/2009 | Imahori ............... G02B 7/1805 359/834 |
| 2010/0076268 A1* | 3/2010 | Takasugi ............ A61B 1/00183 600/171 |
| 2012/0075728 A1 | 3/2012 | Takakubo et al. |
| 2019/0146228 A1 | 5/2019 | Lee |
| 2019/0250400 A1* | 8/2019 | Ricks .................... G02B 27/10 |
| 2019/0265479 A1* | 8/2019 | Yokoyama ............... G02B 5/04 |
| 2021/0208487 A1* | 7/2021 | Cho .................... G02B 13/009 |

FOREIGN PATENT DOCUMENTS

| | | |
|---|---|---|
| CN | 109782381 A | 5/2019 |
| JP | 2-77001 A | 3/1990 |
| JP | 2002-48904 A | 2/2002 |
| JP | 2006-91344 A | 4/2006 |
| JP | 2006-227322 A | 8/2006 |
| JP | 2007-187851 A | 7/2007 |
| JP | 2007-203731 A | 8/2007 |
| JP | 2007-328191 A | 12/2007 |
| JP | 2008-77064 A | 4/2008 |
| JP | 2009-122640 A | 6/2009 |
| JP | 2012-230349 A | 11/2012 |
| KR | 10-2012-0031435 A | 4/2012 |
| TW | 201837520 A | 10/2018 |

OTHER PUBLICATIONS

Korean Office Action issued on Jan. 24, 2022, in counterpart Korean Patent Application No. 10-2020-0108987 (7 pages in English and 5 pages in Korean).

Chinese Office Action issued on Apr. 29, 2022, in counterpart Chinese Patent Application No. 202010886057.1 (5 pages in English and 6 pages in Chinese).

Taiwanese Office Action issued on Nov. 3, 2021, in counterpart Taiwanese Patent Application No. 109129567 (6 pages in English and 7 pages in Mandarin).

* cited by examiner

A-A

PRISM FOR OPTICAL IMAGING SYSTEM HAVING PROTRUSION ON SIDE SURFACES

CROSS-REFERENCE TO RELATED APPLICATION(S)

This application claims the benefit under 35 USC 119(a) of Korean Patent Application No. 10-2019-0107438 filed on Aug. 30, 2019 in the Korean Intellectual Property Office, the entire disclosure of which is incorporated herein by reference for all purposes.

BACKGROUND

1. Field

The following description relates to a prism configured to fold an optical path of an optical imaging system.

2. Description of Related Art

An optical imaging system may be mounted on a portable terminal device. However, most portable terminal devices, such as smartphones, may have a reduced thickness such that it may not be easy to mount an optical imaging system having a long focal length on the portable terminal devices. A folded optical imaging system may resolve the above-described issue. For example, in a folded optical imaging system, a plurality of lenses may be disposed in a length direction of a portable terminal device using a prism. However, as a prism used for such an optical imaging system may have a small size, it may be difficult to manufacture such a prism through a forming process. Thus, there has been demand for a prism having light transmissivity and reflectivity, which may be easily manufactured and which is reliable.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A prism having light transmissivity and reflectivity, which may be easily manufactured and which is reliable.

In one general aspect, a prism for an optical imaging includes an incident surface on which light is incident; an emission surface from which light is emitted; a reflective surface configured to reflect light incident to the incident surface to the emission surface; and a discontinuous portion disposed at one or both of a boundary portion between the incident surface and the reflective surface and a boundary portion between the emission surface and the reflective surface.

The discontinuous portion may be a stepped portion, a projection having a height, or shaped as a linear line.

The prism for an optical imaging system may include a reflection prevention layer disposed on the incident surface and the emission surface.

The prism for an optical imaging system may include a reflection prevention layer and an infrared cut-off layer disposed on the reflective layer.

The reflective layer may be configured to have a wavefront aberration different from wavefront aberrations of the incident surface and the emission surface.

A portion at which the incident surface and the emission surface are connected to the reflective surface may be painted with a light-shielding paint or may have a roughness to prevent a flare phenomenon.

The emission surface may include a light transmissive area and a light shielding area.

The light transmissive area may have a circular shape or an oval shape.

The prism for an optical imaging system may include a first protrusion disposed on both of side surfaces of the prism and configured to be coupled to a housing or a bracket of a camera module.

The prism for an optical imaging system may include a second protrusion disposed on the first protrusion and extending in a same direction as an extending direction of the first protrusion.

An area of the first protrusion may be greater than an area of the second protrusion.

A length of the first protrusion may be greater than a length of the second protrusion.

In another general aspect, a prism for use in optical imaging includes three quadrangular surfaces including an incident surface, an emission surface, and a reflective surface; two side surfaces connecting the incident surface, the emission surface, and the reflective surface; and at least one protrusion extending from one or both of the side surfaces, the at least one protrusion being configured to rotate the prism to adjust an angle of light incident to the incident surface or an angle of light transmitted from the emission surface.

The at least one protrusion may include a first protrusion extending from a first side surface of the two side surfaces and a second protrusion extending from a second side surface of the two triangular side surfaces.

The first protrusion may be a same size as the second protrusion.

The prism may include a third protrusion extending from the first protrusion and a fourth protrusion extending from the second protrusion.

The third protrusion may have a different size than the first protrusion and the fourth protrusion may have a different size than the second protrusion.

The prism may include first edge portion at which the incident surface is connected to the reflective surface; and a second edge portion at which the reflective surface is connected to the emission surface, and each of the first edge portion and the second edge portion may have an obtuse angle with respect to the reflective surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
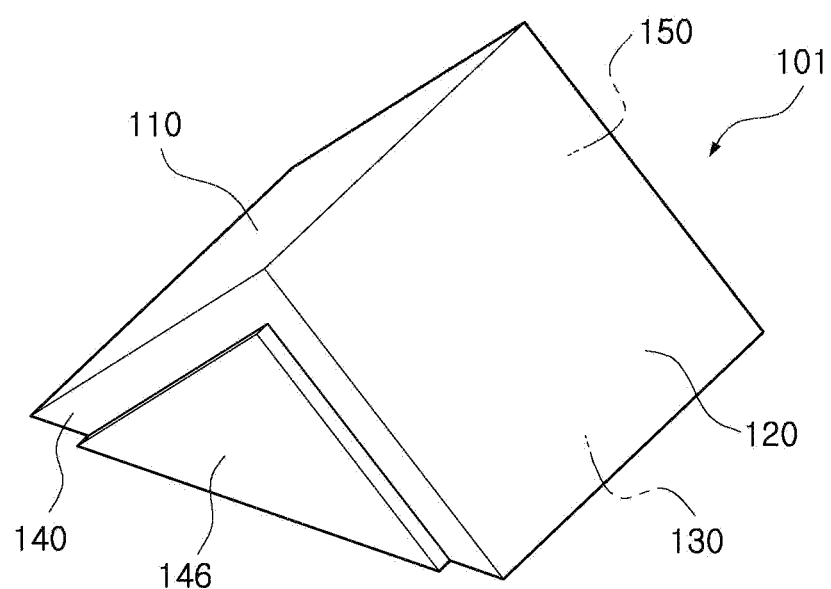
FIG. 1 is a perspective diagram illustrating a first example of a prism for an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
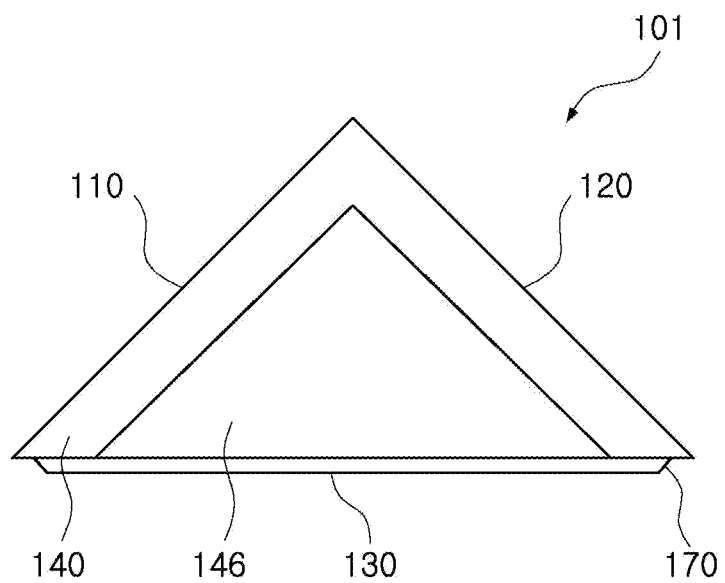
FIG. 2 is a lateral diagram illustrating the prism illustrated in FIG. 1.

A first example of a prism for an optical imaging system will be described with reference to FIGS. 1 to 3.

A prism 101 of the first example may have a form formed by cutting a rectangular parallelepiped or a regular hexahedron in half in a diagonal direction. The prism 101 may have three quadrangular surfaces and two triangular surfaces. For example, each of an incident surface 110, an emission surface 120, and a reflective surface 130 of the prism 101 may have a quadrangular shape, and each of both side surfaces 140 and 150 of the prism 101 may have a triangular shape.

The prism 101 may be formed of a certain material. For example, the prism 101 may be formed of a plastic material able to be easily manufactured and processed. However, a material of the prism 101 is not limited to a plastic material. For example, the prism 101 may be manufactured using a glass material as long as the prism 101 may have a size mountable on a portable terminal device.

The prism 101 may be manufactured through a certain process. For example, the prism 101 may be manufactured through an injection forming process as long as reliable process quality is obtained. When the prism 101 is manufactured as above, it may not be necessary to perform a grinding process such that a manufacturing process of the prism 101 may be simplified.

The prism 101 may be configured to be easily mounted on a camera module. For example, a first protrusion 146 which may be combined with a housing or a bracket of a camera module may be disposed on both side surfaces 140 and 150 of the prism 101.

The prism 101 may be configured to adjust a position of the reflective surface 130 with reference to both side surfaces 140 and 150. For example, the prism 101 may adjust an angle of light incident to the incident surface 110 or an angle of light transmitted from the emission surface 120 by rotating about the first protrusion 146 disposed on both side surfaces 140 and 150.

The prism 101 may have a certain shape formed by an injection forming process. For example, as illustrated in FIG. 2, a discontinuous portion 170 may be disposed on a boundary portion on which the reflective surface 130 is connected to the incident surface 110 and a boundary portion on which the reflective surface 130 is connected to the emission surface 120. The discontinuous portion 170 may be formed by a certain length in a width direction of the prism 101. The discontinuous portion 170 may be configured as a stepped portion having a certain difference, a projection having a fine height, or configured to have a linear line shape.

In an example, the discontinuous portion 170 may be disposed on an edge of the reflective surface 130, but the configuration is not limited thereto. The discontinuous portion 170 may be disposed on an edge of the incident surface 110 or an edge of the emission surface 120 depending on a type of a die for an injection forming process.

The prism 101 may be configured to have a certain wavefront aberration. For example, the incident surface 110 and the emission surface 120 of the prism 101 may be configured to have a wavefront aberration of ½λ, and the reflective surface 130 of the prism 101 may be configured to have a wavefront aberration of ¼λ. The prism 101 configured as above may decrease an aberration caused by folding an optical path.

Figure 3:
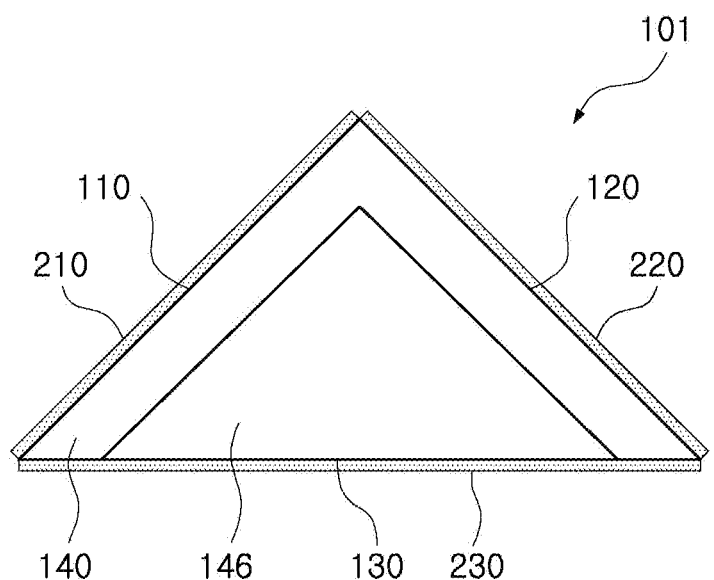
FIG. 3 is a lateral diagram illustrating the prism having a form different from the example illustrated in FIG. 1.

The prism 101 may include a plurality of coating layers as illustrated in FIG. 3. As an example, a reflection prevention layer 210 may be disposed on the incident surface 110 and a reflection prevention layer 220 may be disposed on the emission surface 120 of the prism 101. As another example, a reflection prevention layer and an infrared cut-off layer 230 may be disposed on the reflective surface 130 of the prism 101.

In the description below, another example of the prism for an optical imaging system will be described. The elements the same as or similar to the aforementioned example will be described with the same reference numerals, and the detailed descriptions thereof will not be provided.

Figure 4A:
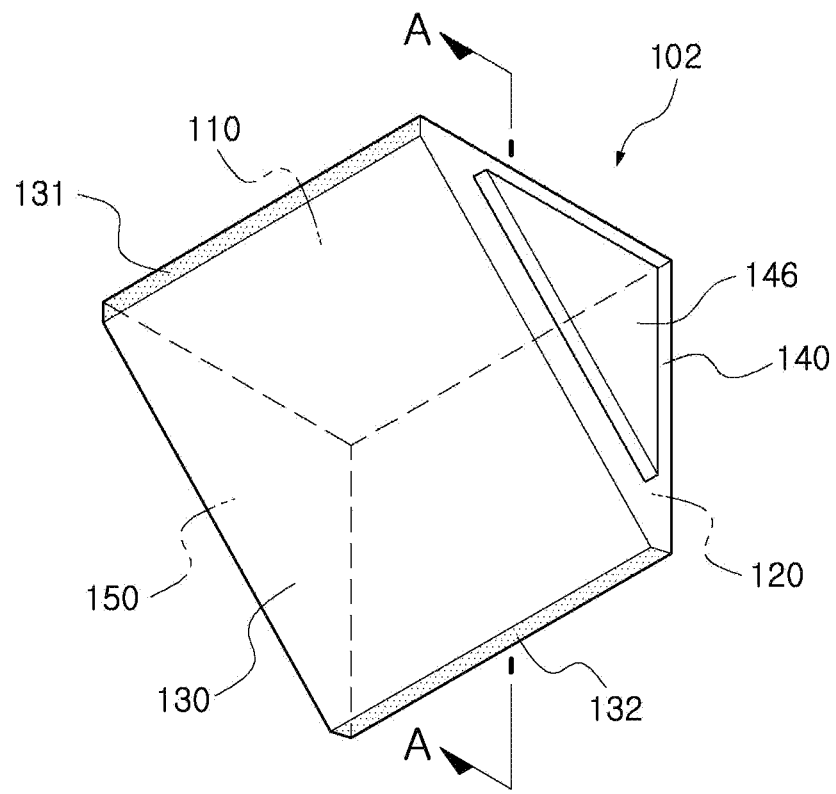
FIG. 4A is a perspective diagram illustrating a second example of a prism for an optical imaging system.
Figure 4B:
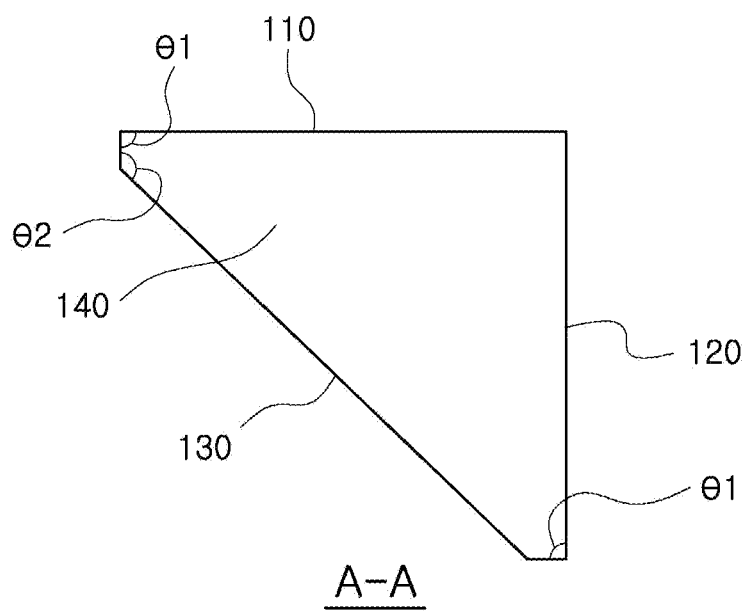
FIG. 4B is a section diagram taken along line A-A in FIG. 4A.

A second example of a prism for an optical imaging system will be described with reference to FIGS. 4A and 4B.

A prism 201 in the example may have a form formed by cutting a rectangular parallelepiped or a regular hexahedron in half in a diagonal direction. The prism 201 may have three quadrangular surfaces and two triangular surfaces. For example, each of an incident surface 110, an emission surface 120, and a reflective surface 130 of the prism 201 may have a quadrangular shape, and each of both side surfaces 140 and 150 of the prism 201 may have a triangular shape.

The prism 201 may include a plurality of chamfer regions. For example, a portion 131 on which the incident surface 110 is connected to the reflective surface 130 and a portion 132 on which the reflective surface 130 is connected to the emission surface 120 may be configured to have certain angles $\Theta 1$ and $\Theta 2$, respectively. Each of the portions 131 and 132 may be processed to have an obtuse angle with respect to the reflective surface 130. As an example, a first angle $\Theta 1$ formed by the portions 131 and 132, the incident surface 110, and the emission surface 120 may be 90 degrees. As another example, a second angle $\Theta 2$ formed by the portions 131 and 132 and the reflective surface 130 may be 135 degrees.

The portions 131 and 132 may be configured to not cause a flare phenomenon. As an example, a light-shielding film may be attached to the portions 131 and 132 or the portions 131 and 132 may be painted with a light-shielding paint. As another example, the portions 131 and 132 may be processed to have roughness such that light may be scattered.

Figure 5:
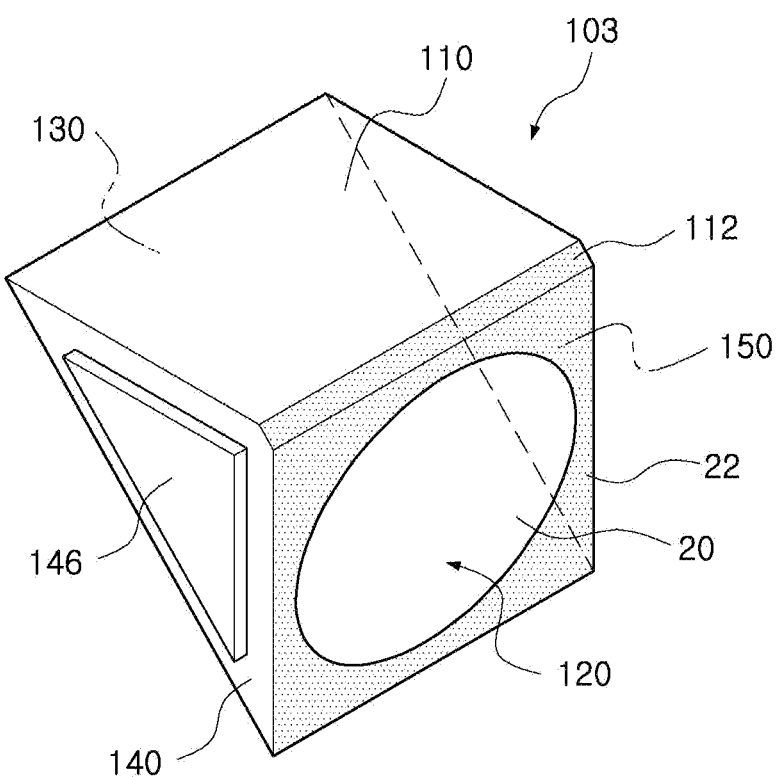
FIG. 5 is a perspective diagram illustrating a third example of a prism for an optical imaging system.

A third example of a prism for an optical imaging system will be described with reference to FIG. 5.

A prism 103 in the example may have a form formed by cutting a rectangular parallelepiped or a regular hexahedron in half in a diagonal direction. The prism 103 may have three quadrangular surfaces and two triangular surfaces. For example, each of an incident surface 110, an emission surface 120, and a reflective surface 130 of the prism 103 may have a quadrangular shape, and each of both side surfaces of the prism 103 may have a triangular shape.

The prism 103 may include one or more chamfer regions. For example, a portion 112 on which the incident surface 110 is connected to the emission surface 120 may be processed to have an obtuse angle with respect to the incident surface 110 or the emission surface 120.

The portion 112 may be configured to not cause a flare phenomenon. As an example, a light-shielding film may be attached to the portion 112 or the portion 112 may be painted with a light-shielding paint. As another example, the portion 112 may be processed to have roughness such that light may be scattered.

Also, the prism 103 may be configured to limit a light emitting area. For example, the emission surface 120 of the prism 103 may include a light transmissive area 20 to which light may be incident and a light-shielding area 22 which may block incident light.

The light transmissive area 20 may be configured to have a shape the same as or similar to a shape of a cross-sectional surface of a lens included in the optical imaging system. For example, the light transmissive area 20 may have a shape the same as or similar to an effective area of a lens (hereinafter, a first lens) disposed the most adjacent to an object side in the optical imaging system. As an example, when the effective area of the first lens has a circular shape, the light transmissive area 20 may also have a circular shape. As another example, the effective area of the first lens has an oval shape or a circular shape in which two opposite ends are cut out, the light transmissive area 20 may have an oval shape. However, a shape of the light transmissive area 20 is not limited to the shape of the effective area of the first lens. As an example, the light transmissive area 20 may have a circular shape regardless of the shape of the effective area of the first lens.

The light-shielding area 22 may be disposed in a portion of the emission surface 120 other than the light transmissive area 20. The light-shielding area 22 may be formed by a light-shielding film, a light-shielding paint, and the like. The light-shielding area 22 configured as above may reduce the phenomenon in which unnecessary light is emitted through or reflected from the emission surface 120 when an object is imaged.

Figure 6:
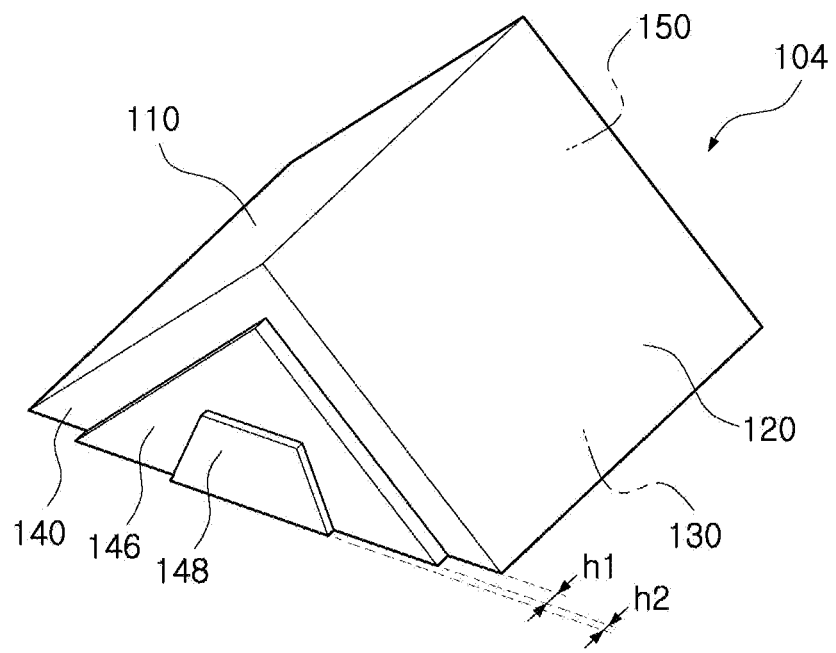
FIG. 6 is a perspective diagram illustrating a fourth example of a prism for an optical imaging system.

A fourth example of a prism for an optical imaging system will be described with reference to FIG. 6.

A prism 104 in the example may have a form formed by cutting a rectangular parallelepiped or a regular hexahedron in half in a diagonal direction. The prism 104 may have three quadrangular surfaces and two triangular surfaces. For example, each of an incident surface 110, an emission surface 120, and a reflective surface 130 of the prism 104 may have a quadrangular shape, and each of both side surfaces 140 and 150 of the prism 104 may have a triangular shape.

The prism 104 may include a plurality of protrusions 146 and 148 on side surfaces 140 and 150. A first protrusion 146 extending in a width direction of the prism 104 may be disposed on the side surfaces 140 and 150, and a second protrusion 148 extending in a direction the same as the extending direction of the first protrusion 146 may be disposed on the first protrusion 146.

The first protrusion 146 and the second protrusion 148 may have different sizes. As an example, an area of the first protrusion 146 may be greater than an area of the second protrusion 148. As another example, a length h1 of the first protrusion 146 may be greater than a length h2 of the second protrusion 148. One or more of the first protrusion 146 and the second protrusion 148 may be combined with a housing or a bracket for supporting a prism of a camera module.

Figure 7:
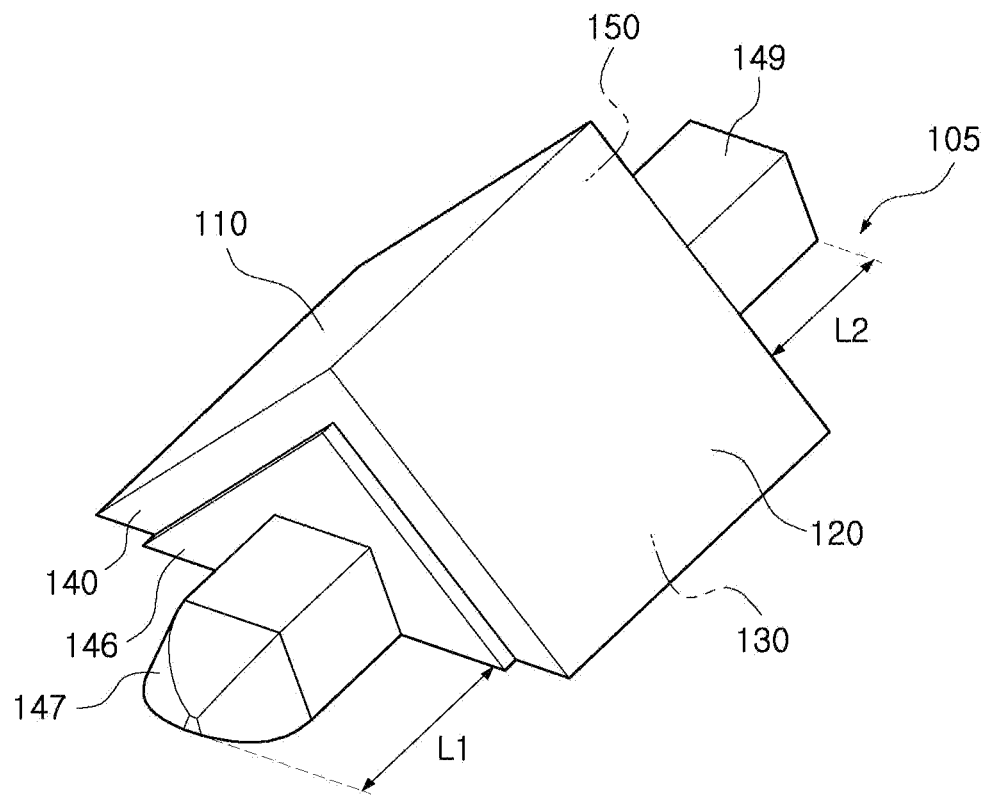
FIG. 7 is a perspective diagram illustrating a fifth example of a prism for an optical imaging system.
Figure 8:
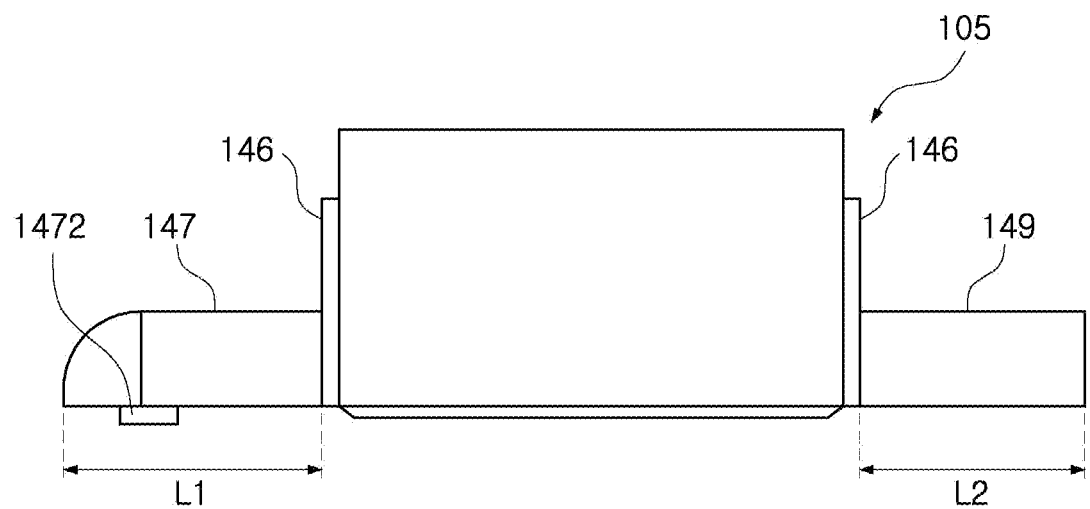
FIG. 8 is a front elevation diagram illustrating the prism illustrated in FIG. 7.

A fifth example of a prism for an optical imaging system will be described with reference to FIGS. 7 and 8.

A prism 105 in the example may have a form formed by cutting a rectangular parallelepiped or a regular hexahedron in half in a diagonal direction. The prism 105 may have three quadrangular surfaces and two triangular surfaces. For example, each of an incident surface 110, an emission surface 120, and a reflective surface 130 of the prism 105 may have a quadrangular shape, and each of both side surfaces 140 and 150 of the prism 105 may have a triangular shape.

A plurality of protrusions 146, 147, and 149 may be formed on side surfaces 140 and 150 of the prism 105. A first protrusion 146 extending in a width direction of the prism 105 may be disposed on the side surfaces 140 and 150. Second protrusions 147 and 149 having different shapes may be formed on the first protrusion 146. For example, a length L1 of the second protrusion 147 may be different from a length L2 of the second protrusion 149. In the example, the length L1 of the second protrusion 147 may be greater than the length L2 of the second protrusion 149.

An end of the second protrusion 147 may have a shape including a curved surface. For example, an end of the second protrusion 147 may a curved surface. The end of the second protrusion 147 may have a semi-circular shape. The second protrusion 147 may have a projection 1472 protruding to one side.

An end of the second protrusion 149 may have a shape different from a shape of the end of the second protrusion 147. For example, an end of the second protrusion 149 may have a shape which does not include a curved surface. The end of the second protrusion 149 in the example may have a prismatic shape formed with only planar surfaces.

Figure 9:
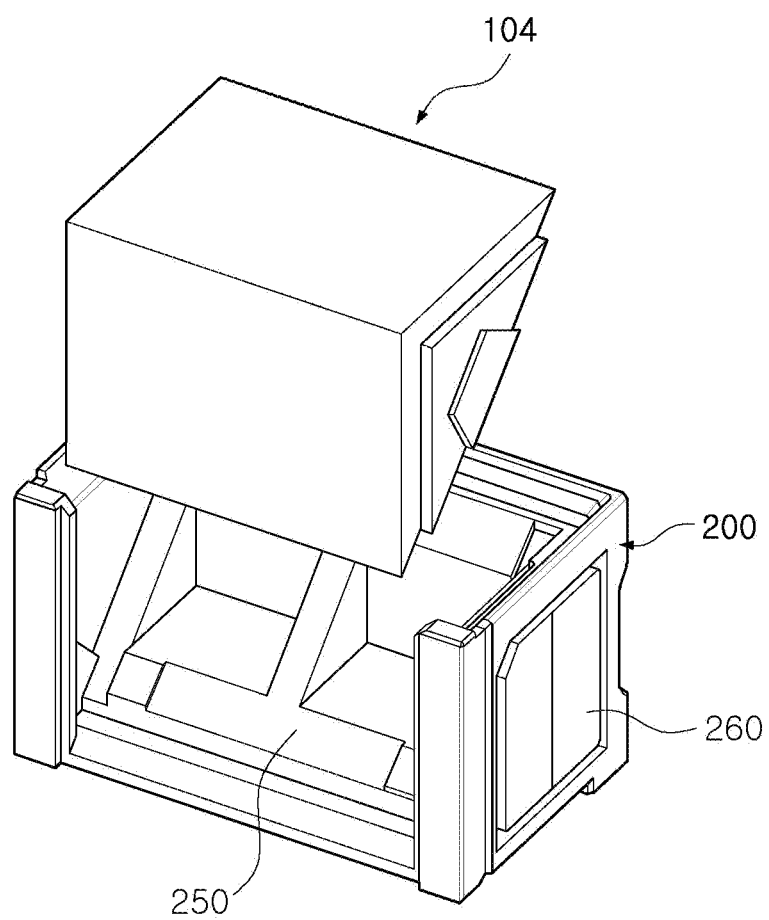
FIGS. 9, 10, and 11 are diagrams illustrating a combination relationship between the prism illustrated in FIG. 6 and a bracket of a camera module.
Figure 10:
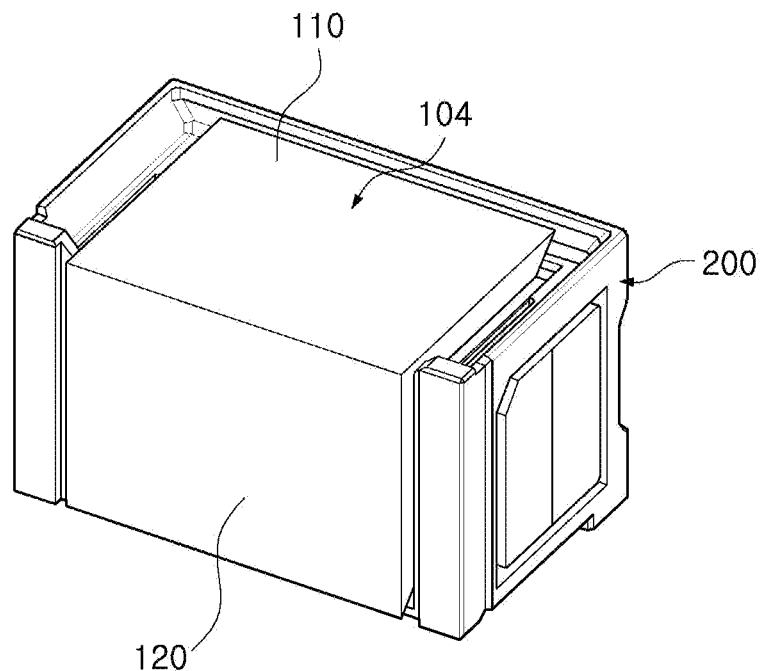
Figure 11:
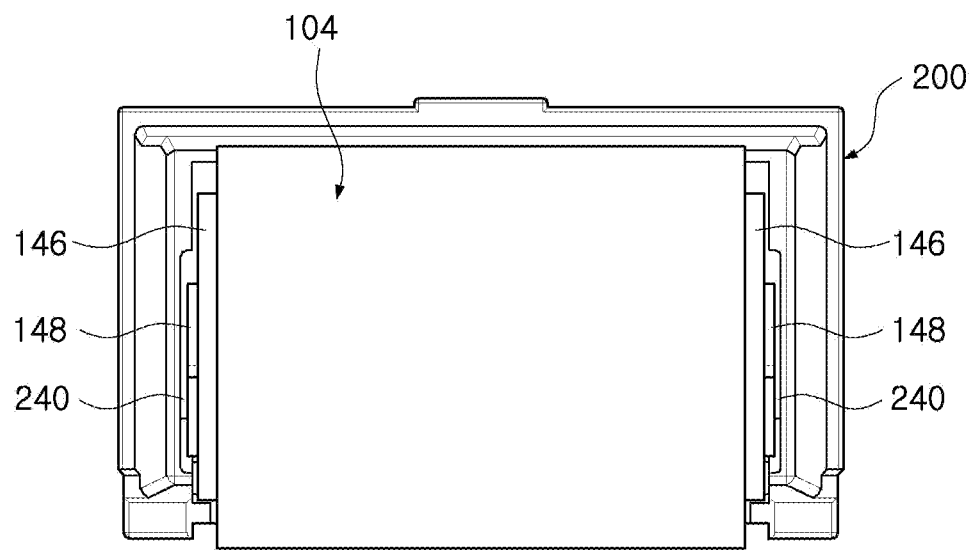

An example of a combination structure of a prism and a camera module will be described with reference to FIGS. 9 to 11.

A prism 104 in the example may be mounted on a camera module. For example, the prism 104 may be mounted on a bracket 200 exclusively used for a prism, provided in a camera module. The bracket 200 may include an accommodation space 250 for accommodating the prism 104. The accommodation space 250 may have a shape and a size the same as or similar to those of the prism 104. One or more first driving means 260 may be disposed on a side surface of the bracket 200. The first driving means 260 may generate a driving force for moving the prism 104. Although not illustrated in the diagram, a second driving means for interacting with the driving means 260 may be disposed on a side surface or a reflective surface of the prism 104. The first driving means and the second driving means may be implemented by a magnet and a coil, respectively.

An element for being coupled to the protrusion of the prism 104 may be disposed in the accommodation space 250 of the bracket 200. For example, a groove 240 may be formed in both side surfaces of the accommodation space 250, as illustrated in FIG. 11. The groove 240 may allow the prism 104 to be stably mounted by being coupled to a second protrusion 148 of the prism 104.

According to the aforementioned examples, a prism having light transmissivity and reflectivity, which may be easily manufactured and reliable, may be provided.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A prism for an optical imaging system, comprising:
an incident surface on which light is incident;
an emission surface from which light is emitted;
a reflective surface configured to reflect light incident to the incident surface to the emission surface;
a discontinuous portion disposed on an edge of one of the incident surface, the emission surface, and the reflective surface, and disposed at one or both of a boundary portion between the incident surface and the reflective surface and a boundary portion between the emission surface and the reflective surface; and
a first protrusion disposed on both of side surfaces of the prism,
wherein the prism is configured to rotate about the first protrusion,
wherein the first protrusion and the side surfaces of the prism have a similar shape, and
wherein the reflective surface is configured to have a wavefront aberration different from wavefront aberrations of the incident surface and the emission surface.

2. The prism for an optical imaging system of claim 1, wherein the discontinuous portion is a stepped portion, a projection having a height, or shaped as a linear line.

3. The prism for an optical imaging system of claim 1, further comprising a reflection prevention layer disposed on the incident surface and the emission surface.

4. The prism for an optical imaging system of claim 1, further comprising a reflection prevention layer and an infrared cut-off layer disposed on the reflective surface.

5. The prism for an optical imaging system of claim 1, wherein a portion at which the incident surface and the emission surface are connected to the reflective surface is painted with a light-shielding paint or has a roughness to prevent a flare phenomenon.

6. The prism of claim 1, wherein the reflective surface has a wavefront aberration that is lower than the wavefront aberrations of the incident surface and the emission surface.

7. The prism for an optical imaging system of claim 1, wherein the emission surface includes a light transmissive area and a light shielding area.

8. The prism for an optical imaging system of claim 7, wherein the light transmissive area has a circular shape or an oval shape.

9. The prism for an optical imaging system of claim 1, wherein the first protrusion is configured to be rotatably coupled to a housing or a bracket of a camera module.

10. The prism for an optical imaging system of claim 9, further comprising:
    a second protrusion disposed on the first protrusion and extending in a same direction as an extending direction of the first protrusion.

11. The prism for an optical imaging system of claim 10, wherein an area of the first protrusion is greater than an area of the second protrusion.

12. The prism for an optical imaging system of claim 10, wherein a length of the first protrusion is greater than a length of the second protrusion.

\* \* \* \* \*